United States Patent
Hirosawa (10) Patent No.: US 9,500,894 B2
(45) Date of Patent: Nov. 22, 2016

(54) LIQUID CRYSTAL DISPLAY DEVICE

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 43 days.

(21) Appl. No.: 14/682,336

(22) Filed: Apr. 9, 2015

(65) Prior Publication Data

US 2015/0309376 A1    Oct. 29, 2015

(30) Foreign Application Priority Data

Apr. 25, 2014    (JP) ................. 2014-091735

(51) Int. Cl.
*G02F 1/1333*    (2006.01)
*G02F 1/1343*    (2006.01)
*G02F 1/1337*    (2006.01)

(52) U.S. Cl.
CPC ... *G02F 1/133345* (2013.01); *G02F 1/134309* (2013.01); *G02F 1/1337* (2013.01); *G02F 2001/134318* (2013.01); *G02F 2001/134372* (2013.01); *G02F 2001/134381* (2013.01)

(58) Field of Classification Search
CPC ....... G02F 2001/134381; G02F 2001/134318; G02F 1/134309; G02F 1/134363; G02F 1/136213; G02F 2001/134372; G02F 1/133345; G02F 1/1337
See application file for complete search history.

(56) References Cited

U.S. PATENT DOCUMENTS

| | | | |
|---|---|---|---|
| 2010/0091231 A1* | 4/2010 | Nishimura | G02F 1/134363 349/139 |
| 2011/0234947 A1 | 9/2011 | Hirosawa | |
| 2013/0278852 A1* | 10/2013 | Yamamoto | G02F 1/136286 349/39 |
| 2014/0118649 A1 | 5/2014 | Hirosawa | |

FOREIGN PATENT DOCUMENTS

JP    2011-209454    10/2011

* cited by examiner

*Primary Examiner* — Dennis Y Kim
(74) *Attorney, Agent, or Firm* — Oblon, McClelland, Maier & Neustadt, L.L.P.

(57) ABSTRACT

A first substrate includes a gate line extending in a first direction, a first interlayer insulating film covering the gate line, a first common electrode formed on the first interlayer insulating film extending in a second direction crossing the first direction, a second interlayer insulating film covering the first common electrode, a source line extending in the second direction, and a third interlayer insulating film covering the source line. A pixel electrode includes a main pixel electrode extending in the second direction on the third interlayer insulating film. A second common electrode includes a second main common electrode extending in the second direction on the third interlayer insulating film and facing the source line. The second common electrode is set to the same potential as the first common electrode. A first alignment film covers the pixel electrode and the second common electrode.

9 Claims, 7 Drawing Sheets

LIQUID CRYSTAL DISPLAY DEVICE

CROSS-REFERENCE TO RELATED APPLICATION

This application is based upon and claims the benefit of priority from prior Japanese Patent Application No.2014-091735 filed Apr. 25, 2014, the entire contents of which are incorporated herein by reference.

BACKGROUND

Recent years, in an active matrix type liquid crystal display device equipped with a switching element in each pixel, a structure using lateral electric field, such as IPS (In-Plane Switching) mode and FFS (Fringe Field Switching) mode is put to practical use. The liquid crystal display device using the lateral electric field mode is equipped with pixel electrodes and common electrodes formed in an array substrate, respectively. Liquid crystal molecules are switched by the lateral electric field substantially in parallel with the principal surface of the array substrate.

On the other hand, another technique is also proposed, in which a double layer pixel electrode is arranged between adjacent source lines to easy influence by leaked electric field from a source line.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device comprises: a first substrate including; a gate line extending in a first direction, a first interlayer insulating film covering the gate line, a first common electrode formed on the first interlayer insulating film and extending in a second direction crossing the first direction, a second interlayer insulating film covering the first common electrode, a source line extending in the second direction on the second interlayer insulating film, a third interlayer insulating film covering the source line, a pixel electrode including a main pixel electrode extending in the second direction on the third interlayer insulating film, a second common electrode including a second main common electrode extending in the second direction on the third interlayer insulating film and facing the source line, the second common electrode set to the same potential as the first common electrode, and a first alignment film covering the pixel electrode and the second common electrode, a second substrate including a second alignment film facing the first alignment film; and a liquid crystal layer held between the first substrate and the second substrate.

According to other embodiment, a liquid crystal display device comprises a plurality of pixels arranged in a first direction and a second direction crossing the first direction in a matrix shape, each pixel comprising: a first substrate including; a gate line extending in the first direction, a first interlayer insulating film covering the gate line, a first common electrode formed on the first interlayer insulating film and extending in the second direction, a second interlayer insulating film covering the first common electrode, a pair of source lines extending in the second direction on the second interlayer insulating film, a third interlayer insulating film covering the pair of source lines, a pixel electrode including a main pixel electrode extending in the second direction on the third interlayer insulating film, a second common electrode including a second main common electrode extending in the second direction on the third interlayer insulating film and facing the pair of source lines, the second common electrode set to the same potential as the first common electrode, and a first alignment film covering the pixel electrode and the second common electrode, a second substrate including a second alignment film facing the first alignment film; and a liquid crystal layer held between the first substrate and the second substrate, wherein the pair of source lines of the plurality of pixels extend in the second direction sandwiching the first common electrode, a connection electrode connects between the adjacent first common electrodes crossing the source line, and the connection electrode is arranged in dispersion.

According to other embodiment, a liquid crystal display device comprises a liquid crystal display device including a plurality of pixels arranged in a first direction and a second direction crossing the first direction in a matrix shape, each pixel comprising: a first substrate including; a gate line arranged substantially in the center of the pixel extending in a first direction, a first interlayer insulating film covering the gate line, a first common electrode formed on the first interlayer insulating film and extending in the second direction, a second interlayer insulating film covering the first common electrode, a pair of source lines arranged on the second interlayer insulating film extending in the second direction, the first common electrode arranged between the pair of source lines, a third interlayer insulating film covering the pair of source lines, a pixel electrode including a main pixel electrode arranged substantially in the center of the pixel and extending in the second direction, and a sub-pixel electrode arranged substantially in the center of the pixel and extending in the first direction, wherein the main pixel electrode and the sub-pixel electrode form a cross shape, and the gate line faces the sub-pixel electrode, a second common electrode including a pair of second main common electrodes extending in the second direction on the third interlayer insulating film and facing the pair of source lines, and a pair of sub-common electrodes arranged in an upper end portion and a lower end portion of the pixel extending in the first direction, wherein the second main common electrodes and the sub-common electrodes form a frame shape defining one pixel, and the second common electrode is set to the same potential as the first common electrode, and a first alignment film covering the pixel electrode and the second common electrode, a second substrate including a second alignment film facing the first alignment film; and a liquid crystal layer held between the first substrate and the second substrate.

Figure 1:
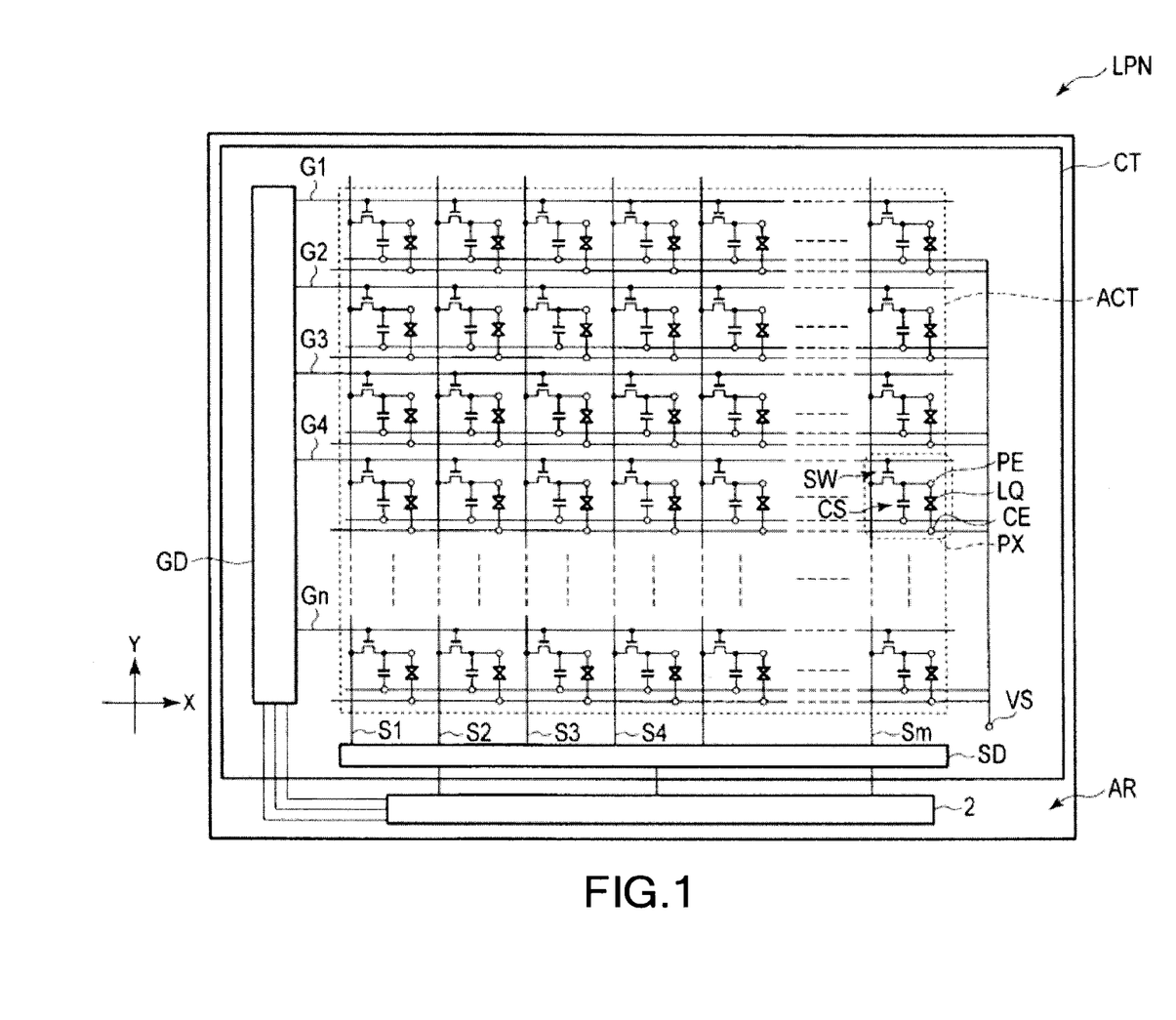
FIG. 1 is a figure schematically showing a structure and an equivalent circuit of a liquid crystal display device according to one embodiment.

FIG. 1 is a figure schematically showing a structure and an equivalent circuit of a liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN is equipped with an active area ACT which displays images. The active area ACT corresponds to an area in a square shape, for example, in which a liquid crystal layer is held between the array substrate AR and the counter substrate CT, and formed of a plurality of pixels PX arranged in a matrix shape.

The liquid crystal display panel LPN is equipped with a plurality of gate lines G (G1-Gn), a plurality of source lines S (S1-Sm), etc., in the active area ACT. The gate lines G linearly extend in a first direction X, respectively. The source lines S linearly extend in a second direction Y orthogonally crossing the first direction X, respectively, and cross the gate lines G. The gate lines G and the source lines S may not necessarily extend linearly, and a portion thereof may be crooked partially. Each gate line G is pulled out to outside of the active area ACT, and connected to a gate driver GD. Each source line S is pulled out to the outside of the active area ACT, and connected to a source driver SD. At least portions of the gate driver GD and the source driver SD are formed in the array substrate AR, for example. The gate driver GD and the source driver SD are connected with a driver IC chip 2 provided in the array substrate AR and having an implemented controller.

Each pixel PX includes a switching element SW, a pixel electrode PE, a common electrode CE, etc. Storage capacitance CS is formed, for example, between the storage capacitance line C and the pixel electrode PE.

The switching element SW is formed of an n channel type thin film transistor (TFT), for example. The switching element SW is electrically connected with the gate line G and the source line S. The switching element SW may be either a top-gate type or a bottom-gate type. Though the semiconductor layer of the switching element SW is formed of poly-silicon in this embodiment, the semiconductor layer may be formed of amorphous silicon.

The pixel electrode PE is arranged in each pixel PX and electrically connected with the switching element SW. The common electrode CE of common potential is arranged in common to the plurality of pixel electrodes PE interposing the liquid crystal layer LQ. An electric power supply portion VS is formed outside of the active area ACT in the array substrate AR to impress a voltage to the common electrode CE. Furthermore, the common electrode CE is drawn to outside of the active area ACT and electrically connected with the electric power supply portion VS. The pixel electrode PE and the common electrode CE may be formed of transparent electric conductive materials, such as Indium Tin Oxide (ITO) and Indium Zinc Oxide (IZO), for example, or opaque line materials, such as aluminum (AD, titanium (Ti), silver (Ag), molybdenum (Mo), tungsten (W), copper (Cu), and chromium (Cr).

In addition, in the liquid crystal display panel LPN according to this embodiment, while the pixel electrode PE is formed in the array substrate AR, at least a portion of the common electrode CE is also formed in the array substrate AR or the counter substrate CT. Liquid crystal molecules of the liquid crystal layer LQ are switched mainly using an electric field formed between the pixel electrode PE and the common electrode CE. The electric field formed between the pixel electrode PE and the common electrode CE is an oblique electric field slightly oblique with respect to a X-Y plane specified by the first direction X and the second direction Y, i.e., the substrates (or lateral electric field substantially in parallel with the principal surface of the substrate surface).

Figure 2:
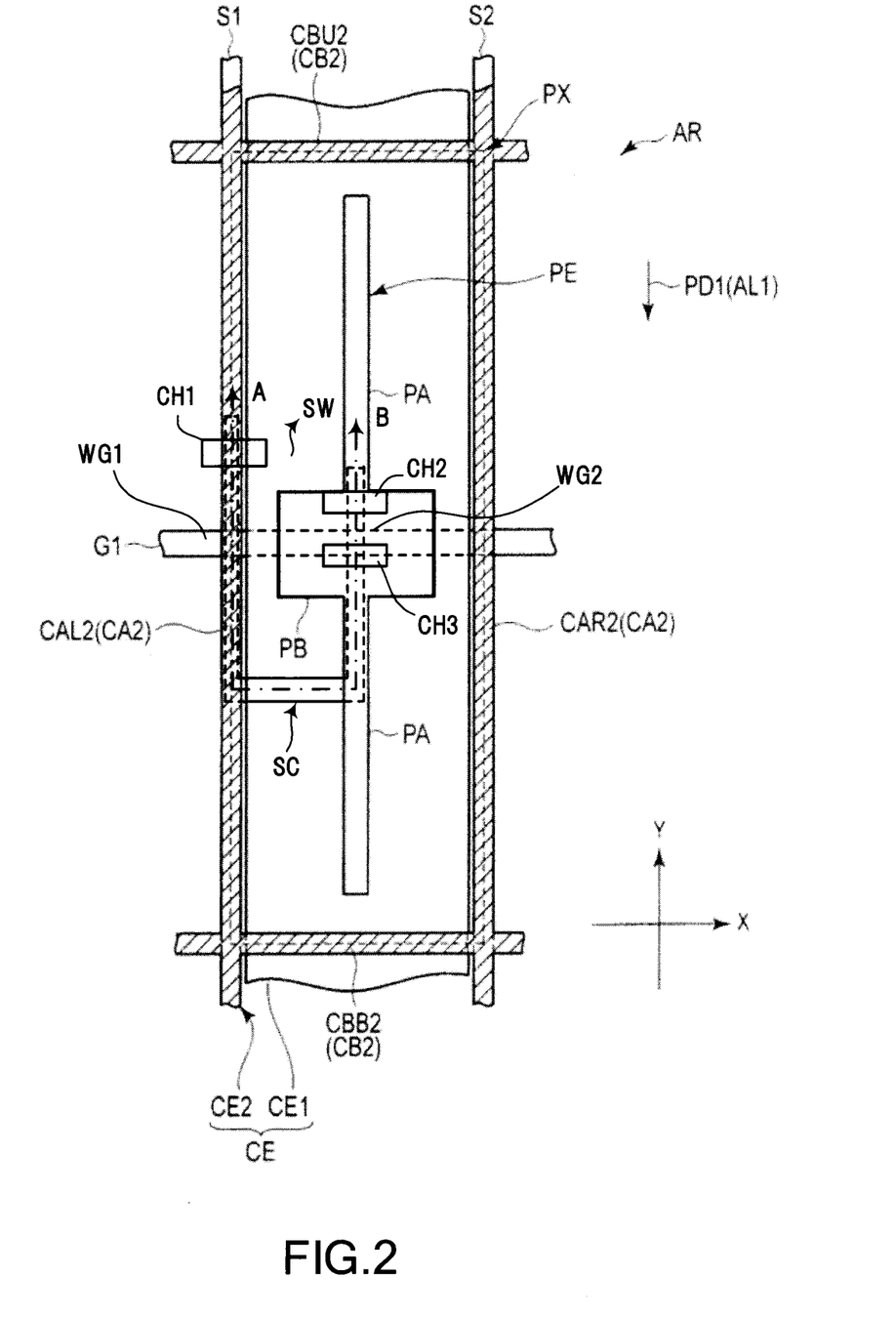
FIG. 2 is a plan view schematically showing a structure of one pixel PX when an array substrate AR shown in FIG. 1 is seen from a counter substrate side according to a first embodiment.

FIG. 2 is a plan view schematically showing a structure of one pixel when the array substrate AR shown in FIG. 1 is seen from the counter substrate side according to a first embodiment.

The array substrate AR is equipped with a gate line G1, a source line S1, a source line S2, a pixel electrode PE and a common electrode CE including first and second common electrodes CE1 and CE2, and a first alignment film AL1, etc.

The gate line G1 extends along the first direction X. The source line S1 and the source line S2 are arranged at intervals along the first direction X and extend in the second direction Y, respectively. As shown in the figure, a storage capacitance line crossing the pixel PX is not provided for forming storage capacitance in this embodiment.

Figures 3A, 3B, 3C:
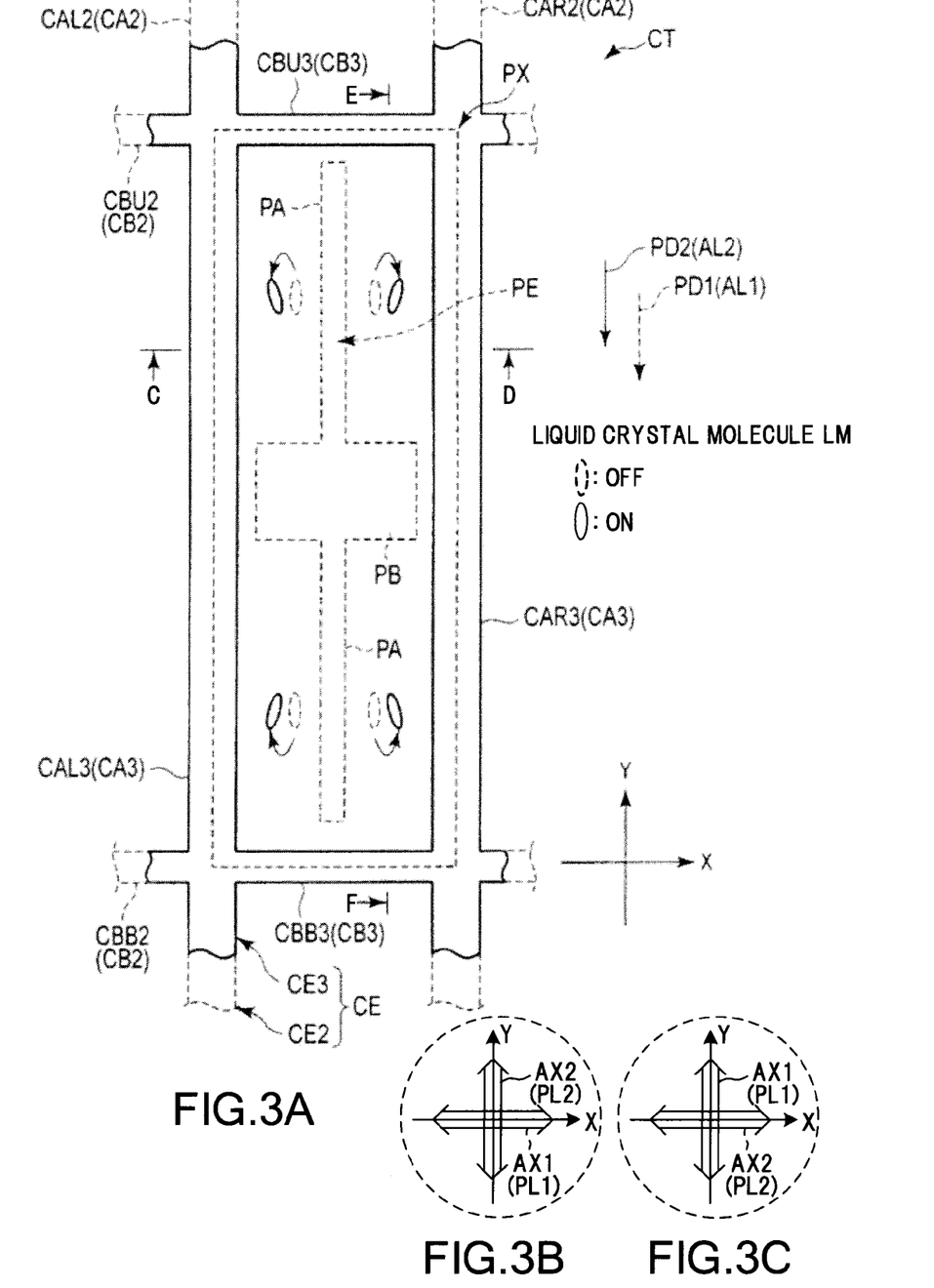
FIG. 3A is a plan view schematically showing a structure of the counter substrate CT in one pixel PX shown in FIG. 1.
FIGS. 3B and 3C are figures showing polarizing axes, respectively.

In this embodiment, the pixel PX corresponds to a square region as shown with a dashed line in FIG. 3A, and is formed in a rectangular shape whose length in the first direction X is shorter than the length in the second direction Y. The length in the first direction X of the pixel PX corresponds to a pitch between the source line S1 and the source line S2 in the first direction X, and the length in the second direction Y of the pixel PX corresponds to a pitch between the gate lines in the second direction Y.

In the illustrated pixel PX, the source line S1 is arranged at the left-hand side end in the pixel PX. Precisely, the source line S1 is arranged striding over a boundary between the illustrated pixel PX and a pixel adjoining the illustrated pixel PX on the left-hand side. The source line S2 is arranged at the right-hand side end. Similarly, the source line S2 is arranged striding over a boundary between the illustrated pixel PX and a pixel adjoining the illustrated pixel PX on the right-hand side. The gate line G1 is arranged in the central portion of the pixel PX. The switching element arranged corresponding to the pixel PX is electrically connected to the gate line G1 and the source line S1, for example.

The pixel electrode PE is located in the approximately middle between the source line S1 and the source line S2. The pixel electrode PE is equipped with a main pixel electrode PA and a sub-pixel electrode PB. The main pixel electrode PA and the sub-pixel electrode PB are integrally or continuously formed, and electrically connected mutually.

The main pixel electrode PA is positioned in a substantially center portion between the source line S1 and the source line S2, and linearly extends along the second direction Y up to the circumferences of the upper end portion and the lower end portion in the pixel PX. The main pixel electrode PA is formed in a stripe shape with the substantially same width along the first direction X. The sub-pixel electrode PB is located in the approximately middle of the pixel PX, and linearly extends along the first direction X to the circumferences of a left-hand side end (the position which overlaps with the source line S1) and the circumferences of a right-hand side end (the position which overlaps with the source line S2) in the pixel PX. That is, the sub-pixel electrode PB is arranged in the position which partially overlaps with the gate line G1, and further crosses at the intermediate portion of the first main pixel electrode PA in the second direction Y. That is, the pixel electrode PE shown herein is formed in a crossed shape. Though the sub-pixel electrode PB is formed in a stripe shape so as to have the same width along the second direction Y, the shape is not restricted to the illustrated example. The pixel electrode PE is electrically connected with the switching element through the sub-pixel electrode PB at the position which overlaps with the gate line G1.

The first common electrode CE1 is arranged between the source line S1 and the source line S2. The first common electrode CE1 has substantially the same width as a pitch between the adjacent source lines in the first direction X, and is arranged substantially on the whole pixel PX. That is, the first common electrode CE1 overlaps with the pixel electrode PE and the gate line G, and is arranged, respectively between the main pixel electrode PA and sub-pixel electrode PB, and the source line S1, and between the main pixel electrode PA and sub-pixel electrode PB, and the source line S2. In this embodiment, the first common electrode CE1 extends in the second direction Y, and is arranged not only in the illustrated pixel PX but pixels which adjoin the illustrated pixel PX in the second direction Y. In addition, it is preferable that the first common electrode CE1 does not to overlap with the source line S1 and the source line S2 as to be described later.

The second common electrode CE2 is equipped with a second main common electrode CA2 and a second sub-common electrode CB2. The second main common electrode CA2 and the second sub-common electrode CB2 are integrally or continuously formed, and electrically connected with mutually. The second main common electrode CA2 linearly extends along the second direction Y, and the second sub-common electrode CB2 linearly extends along the first direction X. That is, the second common electrode CE2 is formed in a lattice shape defining the pixel PX by the second main common electrode CA2 and the second sub-common electrode CB2. The second common electrode CE2 is arranged apart from the pixel electrode PE, and surrounds the pixel electrode PE. The first common electrode CE1 and the second common electrode CE2 are electrically connected with mutually, and further connected with the electric power supply portion VS in the outside of the active area ACT, and set to the same potential each other.

The second main common electrode CA2 faces the source line S. The second main common electrode CA2 is located on the both sides sandwiching the main pixel electrode PA in the X-Y plane. The second main common electrode CA2 is formed in a stripe shape with substantially the same width along the first direction X. The electrode width of the second main common electrode CA2 in the first direction X is substantially the same as the line width of the source line S in the first direction X, for example. In addition, the second main common electrode CA2 may have larger electrode width than the line width of the source line S. The second main common electrode CA2 includes a second main common electrode CAL2 located on the left-hand side of the pixel PX and arranged striding over a boundary between the illustrated pixel PX and a pixel adjoining the illustrated pixel PX on the left-hand side, and a second main common electrode CAR2 located on the right-hand side of the pixel PX and arranged striding over a boundary between the illustrated pixel PX and a pixel adjoining the illustrated pixel PX on the right-hand side. The second main common electrode CAL2 faces the source line S1. The second main common electrode CAR2 faces the source line S2.

The second sub-common electrode CB2 extends along the first direction X. The second sub-common electrode CB2 is formed in a stripe shape with substantially the same width in the second direction Y. In this embodiment, the second sub-common electrode CB2 includes a second sub-common electrode CBU2 located in the upper end portion of the pixel PX, and a second sub-common electrode CBB2 located in the lower portion of the pixel PX.

In the array substrate AR, the pixel electrode PE and the second common electrode CE2 are covered with a first alignment film AL1. Alignment treatment is performed to the first alignment film AL1 along a first alignment direction PD1 to initially align the liquid crystal molecules of the liquid crystal layer LQ. The first alignment direction PD 1 is substantially in parallel with the second direction Y.

FIG. 3A is a plan view schematically showing a structure of the counter substrate CT in one pixel PX shown in FIG. 1. Herein, the plan view in the X-Y plane is shown. In addition, only composition required for explanation is illustrated, and the dashed line shows only the pixel electrode PE and the second common electrode CE2 formed on the array substrate.

The counter substrate CT is equipped with a third common electrode CE3 included in the common electrode CE. The third common electrode CE3 includes a third main common electrode CA3 and a third sub-common electrode CB3. The third main common electrode CA3 and the third sub-common electrode CB3 are integrally or continuously formed, and electrically connected with mutually. The third main common electrode CA3 linearly extends along the second direction Y, and the third sub-common electrode CB3 linearly extends along the first direction X. That is, the third common electrode CE3 is formed in a lattice shape defining the pixel PX by the third main common electrode CA3 and the third sub-common electrode CB3. The third common electrode CE3 is electrically connected with the first common electrode CE1 and the second common electrode CE2 in the outside of the active area, etc., for example, and set to the same potential as the first and second common electrodes CE1 and CE2.

The third main common electrode CA3 faces the second main common electrode CA2 and extends in parallel with the second main common electrode CA2. The third main common electrode CA3 is formed in a stripe shape with the substantially same width along the first direction X. The width of the third main common electrode CA3 is substantially the same as that of the second main common electrode CA2. In this embodiment, the third main common electrode CA3 includes a third main common electrode CAL3 located in the left-hand side end of the pixel PX, and formed striding over a boundary between the illustrated pixel PX and a pixel PX adjoining on its left-hand side, and a third main common electrode CAR3 located in the right-hand side end of the pixel PX, and formed striding over a boundary between the illustrated pixel PX and a pixel PX adjoining on its right-hand side. The third main common electrode CAL3 faces the second main common electrode CAL2, and the third main common electrode CAR3 faces the second main common electrode CAR2.

The third sub-common electrode CB3 faces the second sub-common electrode CB2, and extends in parallel with the second sub-common electrode CB2. The third sub-common electrode CB3 is formed in a stripe shape along the second direction Y with substantially the same width. The width of the third sub-common electrode CB3 is substantially the same as the width of the second sub-common electrode CB2. In this embodiment, the third sub-common electrode CB3 includes a third sub-common electrode CBU3 located in the upper-side end portion of the pixel PX, and formed striding over a boundary between the illustrated pixel PX and a pixel PX adjoining on its upper side, and a third sub-common electrode CBB3 located in the lower-side end portion of the pixel PX, and formed striding over a boundary between the illustrated pixel PX and a pixel PX adjoining on its lower side. The third sub-common electrode CBU3 faces the second sub-common electrode CBU2, and the third sub-common electrode CBB3 faces the second sub-common electrode CBB2.

In the counter substrate CT, the third common electrode CE3 is covered with a second alignment film AL2. In order to initially align the liquid crystal molecules of the liquid crystal layer LQ, alignment treatment is performed to the second alignment film AL2 along with a second alignment direction PD2. The second alignment treatment direction PD2 is in parallel to the first alignment treatment direction PD1. In this embodiment, the second alignment treatment direction PD2 is the same direction as the first alignment treatment direction PD1. In addition, the first alignment treatment direction PD1 and the second alignment treatment direction PD2 may be opposite directions mutually.

Figure 4:
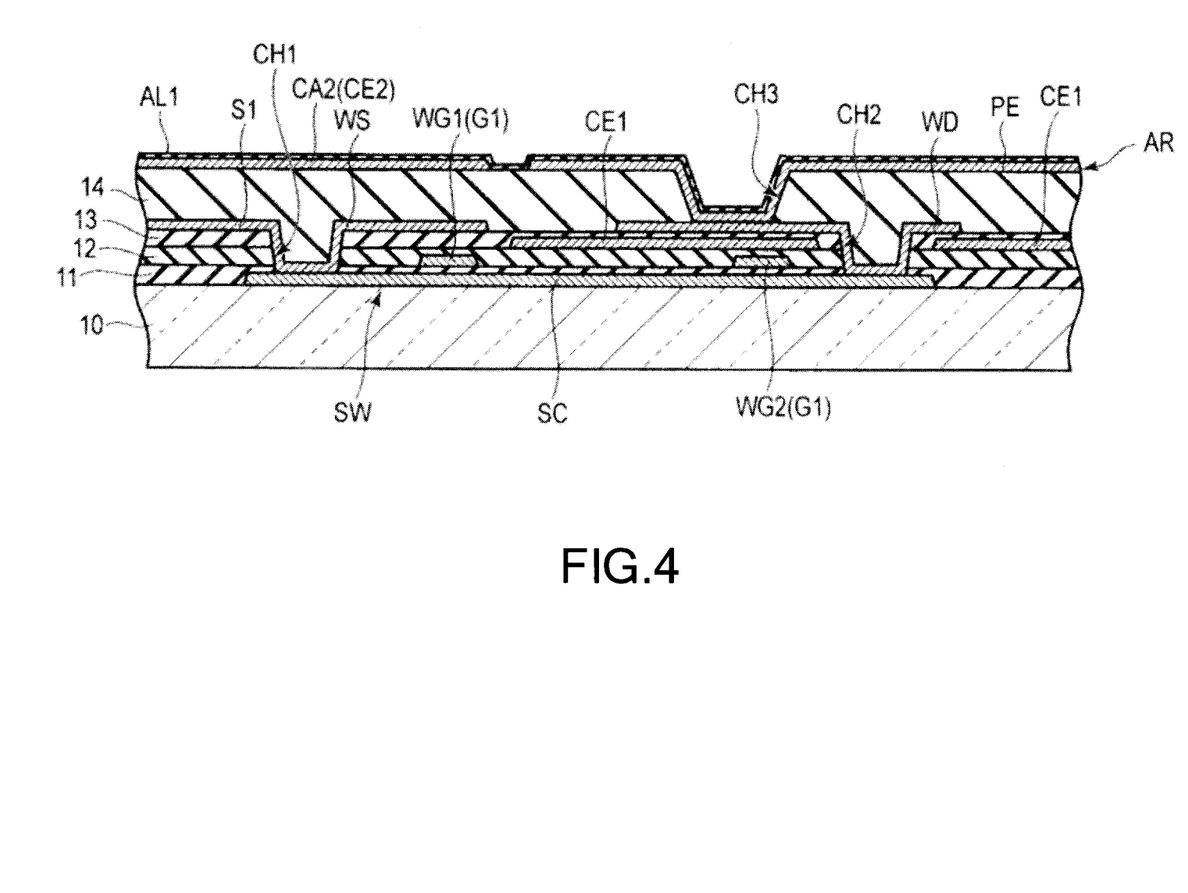
FIG. 4 is a cross-sectional view schematically showing the structure of the liquid crystal display panel LPN taken along line A-B shown in FIG. 2.

FIG. 4 is a cross-sectional view schematically showing the structure of the liquid crystal display panel LPN including a switching element SW taken along line A-B shown in FIG. 2.

The array substrate AR is formed using a first transparent insulating substrate 10. The array substrate AR includes the switching element SW, the gate line G1, the source line S1, the source line S2, the pixel electrode PE, the first common electrode CE1, the second common electrode CE2, a first insulating film 11, a second insulating film 12, a third insulating film 13, a fourth insulating film 14, and the first alignment film AL1, etc., on an internal surface of the first insulating substrate 10 facing the counter substrate CT.

The switching element SW in the illustrated example is formed with a top gated-type, and has a double gate structure with a gate electrode WG1 and a gate electrode WG2. The switching element SW is equipped with a semiconductor layer SC, a source electrode WS, and a drain electrode WI). The semiconductor layer SC is formed in a U shape along the cross-sectional line A-B.

The semiconductor layer SC is formed on the first insulating substrate 10, and covered with the first insulating film 11. The gate electrode WG1 and the gate electrode WG2 are formed of portions of the gate line G1 on the first insulating film 11, and covered with the second insulating film (the first interlayer insulating film) 12.

The first common electrode CE1 is formed on the second insulating film 12, and covered with the third insulating film (a second interlayer insulating film) 13. The first common electrode CE1 faces the gate line G1 as above-mentioned. While the first common electrode CE1 faces the gate electrode WG2 in the gate line G1 in this embodiment, the first common electrode CE1 does not face the gate electrode WG1. The first common electrode CE1 is formed of transparent electric conductive materials, such as ITO and IZO, as above-mentioned.

The source line S1, the source electrode WS, and the drain electrode WD are formed on the third insulating film 13, and covered with the fourth insulating film (a third interlayer insulating film) 14. The source electrode WS is a portion of the source line S1, and electrically connected with the semiconductor layer SC through a contact hole CH1 which penetrates the first insulating film 11, the second insulating film 12, and the third insulating film 13. The source line S1 faces the gate electrode WG1 interposing the second insulating film 12 and the third insulating film 13 therebetween. On the other hand, the source line S1 including the source electrode WS does not face the first common electrode CE1. The drain electrode WD is formed in an island shape, and functions as a seat electrode. The drain electrode WD is electrically connected with the semiconductor layer SC through a contact hole CH2 which penetrates the first insulating film 11, the second insulating film 12, and the third insulating film 13. Moreover, the drain electrode WD faces a first common electrode CE1 interposing the third insulating film 13 therebetween.

The first insulating film 11, the second insulating film 12, and the third insulating film 13 as mentioned above are formed of transparent inorganic system materials, such as silicon nitride and silicon oxide, for example. The fourth insulating film 14 is formed of an organic system material such as a transparent resin material, etc.

The second common electrode CE2 including the second main common electrode CA2 and the pixel electrode PE are formed on the fourth insulating film 14, and covered with the first alignment film AL1 The second main common electrode CA2 is located right above the source line S1. The pixel electrode PE is electrically connected with the drain electrode WD through a contact hole CH3 which penetrates the fourth insulating film 14.

In the above array substrate AR, the storage capacitance CS is mainly formed between the first common electrode CE1 and the drain electrode WD facing each other and interposing the third insulating film 13 therebetween at the time of ON. Moreover, the semiconductor layer SC and the first common electrode CE1 facing each other and interposing the first insulating film 11 and the second insulating film 12 can also form the storage capacitance CS. The storage capacitance CS holds the pixel potential written into each pixel through the switching element SW for a predetermined period.

Figure 5:
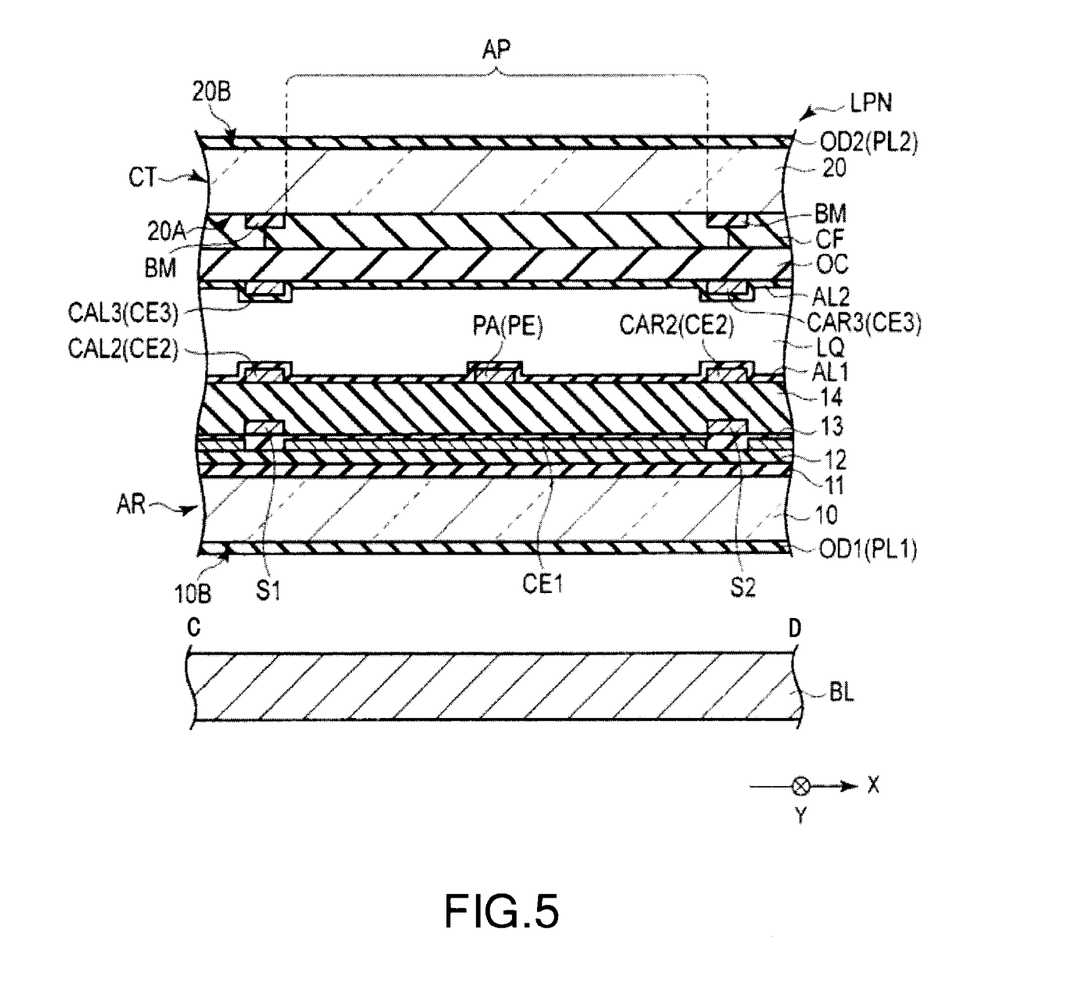
FIG. 5 is a cross-sectional view schematically showing the structure of the liquid crystal display panel LPN taken along line C-D shown in FIG. 3A.
Figure 6:
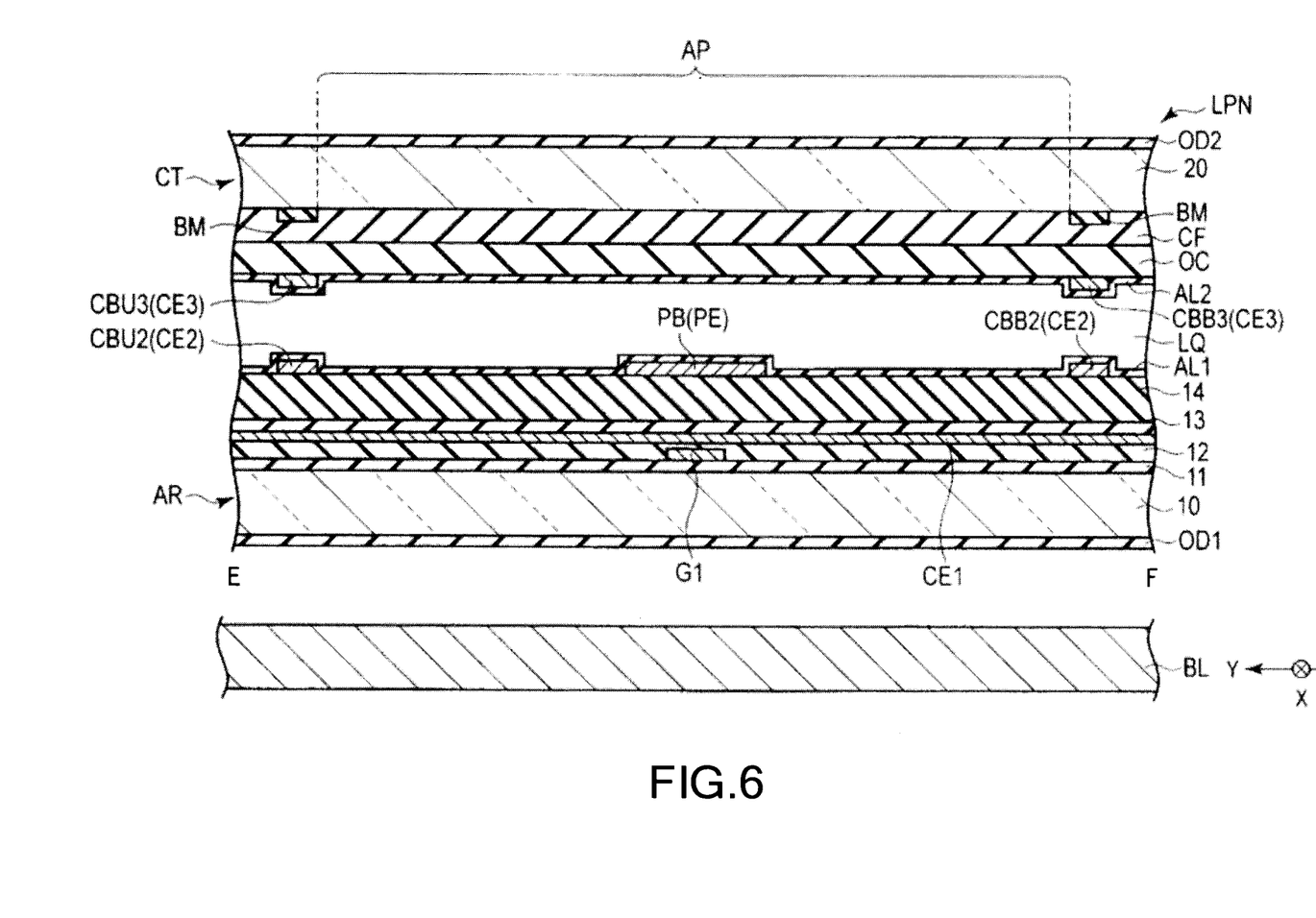
FIG. 6 is a cross-sectional view schematically showing the structure of the liquid crystal display panel LPN taken along line E-F shown in FIG. 3A.

FIG. 5 is a cross-sectional view schematically showing the structure of the liquid crystal display panel LPN taken along line C-D shown in FIG. 3A. FIG. 6 is a cross-sectional view schematically showing the structure of the liquid crystal display panel LPN taken along line E-F shown in FIG. 3A. In addition, only the portions required for explanation are illustrated herein.

A backlight unit BL is arranged on the back side of the array substrate AR forming the liquid crystal panel LPN. Various types of backlight unit BL can be used, and the explanation about its detailed structure is omitted.

The array substrate AR includes the gate line G1, the source line S1, the source line S2, the pixel electrode PE, the first common electrode CE1, the second common electrode CE2, the first insulating film 11, the second insulating film 12, the third insulating film 13, the fourth insulating film 14, and the first alignment film AL1, etc., on an internal surface of the first insulating substrate 10 facing the counter substrate CT.

The gate line G1 is formed on the first insulating film 11, and covered with the second insulating film 12. The first common electrode CE1 is formed on the second insulating film 12, and covered with the third insulating film 13. While the first common electrode CE1 faces the gate line G1, the first common electrode CE1 extends in the second direction Y. The source line S1 and the source line S2 are formed on the third insulating film 13, and covered with the fourth insulating film 14. In this embodiment, the first common electrode CE1 is arranged apart from positions which face the source line S1 and the source line S2.

The main pixel electrode PA and the sub-pixel electrode PB of the pixel electrode PE, and the second main common electrode CAL2, the second main common electrode CAR2, the second sub-common electrode CBU2 and the second sub-common electrode CBB2 in the second common electrode CE2 are formed on the fourth insulating film 14. The main pixel electrode PA is located between the second main common electrode CAL2 and the second main common electrode CAR2, and faces the first common electrode CE1 interposing the third insulating film 13 and the fourth insulating film 14 therebetween. The sub-pixel electrode PB is located between the second sub-common electrode CBU2 and the second sub-common electrode CBB2, and faces the first common electrode CE1 interposing the third insulating film 13 and the fourth insulating film 14 therebetween. The second main common electrode CAL2 faces the source line S1 interposing the fourth insulating film 14 therebetween. The second main common electrode CAR2 faces the source line S2 interposing the fourth insulating film 14 therebetween. The second sub-common electrode CBU2 and the second sub-common electrode CBB2 face the first common electrode CE1 interposing the third insulating film 13 and the fourth insulating film 14 therebetween.

The first alignment film AL1 is arranged on the array substrate AR facing the counter substrate CT, and extends to whole active area ACT. The first alignment film AL1 covers the pixel electrodes PE and the second common electrode CE2, and is arranged also on the fourth insulating film 14. The first alignment film AL 1 is formed of the material which shows a horizontal alignment characteristics.

The counter substrate CT is formed using a second transparent insulating substrate 20. The counter substrate CT includes a black matrix BM, a color filter CF, an overcoat layer OC, the third common electrode CE3, and the second alignment film AL2, etc., on an internal surface of the second insulating substrate 20 facing the array substrate AR.

The black matrix BM is formed on an internal surface 20A of the second insulating substrate 20 facing the array substrate AR and defines each pixel PX. The black matrix BM forms an aperture AP facing the pixel electrode PE. That is, the black matrix BM is arranged so that wiring portions, i.e., the source line S, the gate line G and the switching element SW may face the black matrix BM. Herein, the black matrix BM includes a portion located above the source lines S1 and S2 extending along the second direction Y and a portion located above the second sub-common electrode CBU2 and the second sub-common electrode CBB2 extending along the first direction X, and is formed in the shape of a lattice. In addition, the portion located above the second sub-common electrode CBU2 and the second sub-common electrode CBB2 may be omitted.

The color filter CF is arranged corresponding to each pixel PX. That is, while the color filter CF is arranged in the aperture AP defined by the black matrix BM on the internal surface 20A of the second insulating substrate 20, a portion thereof overlaps with the black matrix BM. The colors of the color filters CF arranged in adjacent pixels PX in the first direction X differ mutually. For example, the color filters CF are formed of resin materials colored by three primary colors of red, blue, and green, respectively. The red color filter formed of the resin material colored in red is arranged corresponding to a red pixel. The blue color filter formed of the resin material colored in blue is arranged corresponding to a blue pixel. The green color filter formed of the resin material colored in green is arranged corresponding to a green pixel. The boundary between the adjacent color filters CF is located in a position which overlaps with the black matrix BM.

The overcoat layer OC covers the color filter CF. The overcoat layer OC eases influence by concave-convex of the surfaces of the color filter CF and the black matrix BM. The overcoat layer OC is formed of a transparent resin material, for example.

The third main common electrodes CAL3 and CAR3 and the third sub-common electrodes CBU3 and CBB3 in the third common electrode CE3 are formed on the overcoat layer OC facing the array substrate AR, and located under the black matrix BM. The third main common electrode CAL3 is located above the source line S1 and faces the second main common electrode CRL2. The third main common electrode CAR3 is located above the source line S2 and faces the second main common electrode CAR2. The third sub-common electrode CBU3 faces the second sub-common electrode CBU2. The third sub-common electrode CBB3 faces the second sub-common electrode CBB2. In the above-mentioned aperture AP, the domains between the pixel electrode PE and the second common electrode CE2, and between the pixel electrode PE and the third common electrode CE3 correspond to transmissive domains which penetrate the backlight.

The second alignment film AL2 is arranged on the counter substrate CT facing the array substrate AR, and extends to whole active area ACT. The second alignment film AL2 covers the third common electrode CE3 and the overcoat layer OC, etc. The second alignment film AL2 is formed of the materials having horizontal alignment characteristics.

The array substrate AR and the counter substrate CT as mentioned-above are arranged so that the first alignment film AM and the second alignment film AL2 face each other. In this case, a pillar-shaped spacer is formed integrally with one of the substrates by resin materials between the first alignment film AL1 on the array substrate AR and the second alignment film AL2 on the counter substrate CT. Thereby, a predetermined gap, for example, a 2-7 μm cell gap, is formed. The array substrate AR and the counter substrate CT are pasted together by seal material arranged outside the active area ACT, while the predetermined cell gap is formed, for example. The liquid crystal layer LQ is held in the cell gap formed between the array substrate AR and the counter substrate CT, i.e., between the first alignment film AL1 and the second alignment film AL2. The liquid crystal layer LQ contains liquid crystal molecules LM. For example, the liquid crystal layer LQ is formed of liquid crystal material whose dielectric anisotropy is positive (posi-type).

A first optical element OD1 is attached on an external surface 10B of the array substrate AR, i.e., the external surface of the first insulating substrate 10 which forms the array substrate AR by adhesives, etc. The first optical element OD1 is located on a side which faces the backlight unit BL of the liquid crystal display panel LPN, and controls the polarization state of the incident light which enters into the liquid crystal display panel LPN from the backlight unit BL. The first optical element OD1 includes a first polarization plate PL1 having a first polarizing axis AX1. Other optical elements such as a retardation film may be arranged between the first polarization plate PL1 and the first insulating substrate 10.

A second optical element OD2 is attached on an external surface 20B of the counter substrate CT, i.e., the external surface of the second insulating substrate 20 which forms the counter substrate CT by adhesives, etc. The second optical element OD2 is located on a display surface side of the liquid crystal display panel LPN, and controls the polarization state of emitted light from the liquid crystal display panel LPN. The second optical element OD2 includes a second polarization plate PL2 having a second polarizing axis AX2. Other optical elements such as a retardation film may be arranged between the second polarization plate PL2 and the second insulating substrate 20.

The first polarizing axis AX1 of the first polarization plate PL1 and the second polarizing axis AX2 of the second polarization plate PL2 are arranged in the Crossed Nichol relationship. In the embodiment shown in FIG. 3B, the first polarization plate PL1 is arranged so that the first polarizing axis AX1 is set in parallel with the first direction X, and the second polarization plate PL2 is arranged so that the second polarizing axis AX2 is set in parallel with the second direction Y. In the example shown in FIG. 3C, the second polarization plate PL2 is arranged so that the second polarizing axis AX2 is set in parallel with the first direction X, and the first polarization plate PL1 is arranged so that the first polarizing axis AX1 is set in parallel with the second direction Y.

Next, operation of the liquid crystal display panel LPN with the above-mentioned structure is explained.

At the time of non-electric field state (OFF), i.e., when potential difference (i.e., electric field) is not formed between the pixel electrode PE and the common electrode CE (first common electrode CE1, second common electrode CE2, third common electrode CE3), the liquid crystal molecules LM of the liquid crystal layer LQ are aligned so that their long axes are aligned in the first alignment treatment direction PD1 of the first alignment film AL1 and the second alignment treatment direction PD2 of the second alignment film AL2 as shown with a dashed line in FIG. 3A. The time OFF corresponds to an initial alignment state, and the alignment direction of the liquid crystal molecules LM at the time of OFF corresponds to the initial alignment direction. Herein, the initial alignment direction of the liquid crystal molecules LM means a direction in which orthogonal projection of the long axis of the liquid crystal molecule LM is carried out to the X-Y plane at the time OFF. The liquid crystal molecule LM at the time of OFF are aligned so that the long axis is initially aligned substantially in parallel with the second direction Y as shown with the dashed line in FIG. 3A. That is, the initial alignment direction of the liquid crystal molecule LM is in parallel to the second direction Y.

At the time of OFF, a portion of the backlight from the backlight unit BL penetrates the first polarization plate PL1, and enters into the liquid crystal display panel LPN. The backlight which entered into the liquid crystal display panel LPN becomes linearly polarized light which perpendicularly intersects with the first polarizing axis AX1 of the first polarization plate PL1. The polarization state of the linearly polarized light does hardly change when the backlight passes the liquid crystal layer LQ at the time OFF. For this reason, the linearly polarized light which penetrates the liquid crystal display panel LPN is absorbed by the second polarization plate PL2 which is arranged in the Crossed Nichol positional relationship with the first polarization plate PL1 (black display).

On the other hand, in the state (at the time of ON), i.e., the state where electric field is formed between the pixel electrode PE and the common electrode CE (voltage is impressed to the liquid crystal layer LQ), lateral electric field substantially in parallel with the substrates (or oblique electric field) is formed between the pixel electrode PE and the common electrode CE. The liquid crystal molecule LM is influenced by the electric field between the pixel electrode PE and the common electrode CE, and the alignment state changes. In the embodiment shown in FIG. 3A, in the lower half region between the pixel electrode PE and the third main common electrode CAL3 in the pixel PX, the liquid crystal molecule LM mainly rotates clockwise to the second direction Y, and turns to the lower left in the figure. Furthermore, in the upper half region of the pixel PX, the liquid crystal molecule LM mainly rotates counterclockwise to the second direction Y, and turns to the upper left in the figure. In the lower half region between the pixel electrode PE and the third main common electrode CAR3 in the pixel PX, the liquid crystal molecule LM mainly rotates counterclockwise to the second direction Y, and turns to the lower right in the figure. Furthermore, in the upper half region of the pixel PX, the liquid crystal molecule LM mainly rotates clockwise to the second direction Y, and turns to the upper right in the figure. Thus, in each pixel PX, at the time ON when the electric field is formed between the pixel electrode PE and the common electrode CE, the alignment direction of the liquid crystal molecule is divided into a plurality of directions with respect to the region in which the liquid crystal molecule LM overlaps with the pixel electrode PE, and domains are formed corresponding to each alignment direction. That is, a plurality of domains is formed in each pixel PX. Thereby, the transmissive region in which the backlight penetrates is formed between the pixel electrode PE and the common electrode CE in each pixel.

At the time of ON, the polarization state of the linearly polarized light which entered into the liquid crystal display panel LPN changes when passing the liquid crystal layer LQ in accordance with the alignment state of the liquid crystal molecule LM. For this reason, at the time of ON, at least a portion of the backlight which passed the liquid crystal layer LQ penetrates the second polarization plate PL2 (white display). However, in the position in which the liquid crystal molecule overlaps with the pixel electrode PE and the common electrode CE, since the liquid crystal molecule is maintained in the initial alignment state, the state becomes a black display like at time of OFF.

Moreover, according to this embodiment, the array substrate AR includes the first common electrode CE1 arranged closer to the first insulating substrate 10 than the source line S and also includes the second main common electrode CA2 arranged closer to the liquid crystal layer LQ than the source line S, and set to the same potential (common potential) as the first common electrode CE1. The first common electrode CE1 in the lower layer is arranged closer to the pixel electrode PE side than the source line S. The second main common electrode CA2 in the upper layer is located right above the source line S. Since the first common electrode CE1 and the second main common electrode CA2 are set to the same potential, an equipotential surface is formed therebetween. The equipotential surface shields undesirable leaked electric field which directs to the liquid crystal layer LQ from the source line S arranged between the first common electrode CE1 and the second common electrode CA2. Thus, the influence by the leaked electric field from the source line S can be eased in the region close to the source line S, and it also becomes possible to control degradation of the display grace.

Moreover, since the influence by the leaked electric field from the source line S which adjoins the pixel electrode PE can be eased, it becomes possible to control degradation of the display grace due to a cross talk. Especially, since undesirable leaked electric field which goes to the liquid crystal layer LQ from the source line S is shielded, even if a driving method in which the polarity of the image signal supplied to each source line S is reversed for every frame is applied, it becomes possible to control degradation of display grace.

Moreover, the first common electrode CE1 is arranged apart from a location facing the source line S. For this reason, it becomes possible to control formation of the undesirable capacitance between the source line S and the first common electrode CE1, and it becomes possible to reduce the load of the source line S. For this reason, it becomes possible to control the fault of display grace and the increase in power consumption resulting from the load of the source line S.

Furthermore, the fourth insulating film 14 with comparatively large film thickness is interposed between the second main common electrode CA2 and the source line S. Accordingly, since the second main common electrode CA2 facing the source line S is more apart from the source line S than the first common electrode CE1, the capacitance formed between the source line S and the second main common electrode CA2 is small, and it becomes possible to reduce the influence by the capacitance to the display.

In addition, although the first common electrode CE1 faces the pixel electrode PE, the comparatively thick insulating film, i.e., the third insulating film 13 and the fourth insulating film 14 are interposed between the first common electrode CE1 and the pixel electrode PE. For this reason, although fringe electric field may be formed between the pixel electrode PE and first common electrode CE1 at the time of ON, lateral electric field between the pixel electrode PE and the second common electrode CE2 and oblique electric field formed between the pixel electrode PE and the third common electrode CE3 mainly affects to the alignment in the penetration domain. Therefore, the influence to the alignment of the liquid crystal molecule LM by the fringe electric field becomes small.

Moreover, according to this embodiment, the first common electrode CE1 faces the gate line G at least in the transmissive region. For this reason, it becomes possible to shield undesirable leaked electric field which goes to the liquid crystal layer LQ from the gate line G. Therefore, the influence by undesirable electric field in the region close to the gate line G in the transmissive region is eased, and it becomes possible to improve display grace.

In the pixels adjoining in the second direction Y, the second sub-common electrode CB2 and the third sub-common electrode CB3 with the same potential each other are arranged. For this reason, while electric field required for the pixel is formed as above-mentioned, it becomes difficult to be subject to the influence by electric field from the pixel which adjoins in the second direction Y. Therefore, it becomes possible to improve display grace.

Moreover, since the third common electrode CE3 is formed in a lattice shape facing the second common electrode CE2, and set to the same potential as the second common electrode CE2, a equipotential surface of common potential is formed between the second common electrode CE2 and the third common electrode CE3. Even if assembling shift arises between the array substrate AR and the counter substrate CT, the equipotential surface maintains the liquid crystal molecule LM in the initial alignment state at the time of ON and OFF. Therefore, it becomes possible to control generating of mixed colors.

According to the embodiment, the drain electrode (or seat electrode) WD of the switching element SW faces the first common electrode CE1 interposing the third insulating film 13 therebetween, and can hold the pixel potential written in each pixel for a predetermined period. For this reason, in order to form storage capacitance CS, the storage capacitance line which crosses the pixel PX becomes unnecessary. Accordingly it becomes possible to expand the area of the transmissive domain in one pixel as compared with the case where the storage capacitance line is arranged, and to improve transmissivity.

Moreover, the sub-pixel electrode PB of the pixel electrode PE has a function which forms electric field for dividing the alignment direction of the liquid crystal molecule in one pixel. The sub-pixel electrode PB is formed so that the sub-pixel electrode PB may have a predetermined size (respective lengths in the first direction X and the second direction Y) required to form such electric field. The second sub-common electrode CB2 of the second common electrode CE2 also has a function which forms electric field for dividing the alignment direction of the liquid crystal molecule in one pixel. The second sub-common electrode CB2 is formed so that the second sub-common electrode CB2 may have a predetermined size (respective lengths in the first direction X and the second direction Y) required to form such electric field. It becomes possible to further expand the transmissive area in one pixel by reducing the arrangement area of the sub-pixel electrode PB and the second sub-common electrode CB2, and to improve transmissivity furthermore.

Inventors reviewed a comparative example that uses a following array substrate AR. A storage capacitance line is arranged under the sub-pixel electrode PB without arranging the first common electrode. The gate lines G is arranged in the upper and lower end portions in the pixel PX, respectively. The second common electrode CE2 in a lattice shape is arranged so as to surround the pixel electrode PE. In the above comparative example, the region overlapping with the storage capacitance line does not contribute to the display. Furthermore, it is necessary to form the second sub-common electrode CB2 facing the gate line located in the upper and lower end portions of the pixel PX, respectively, so as to have a width equal to or larger than the gate line G. Accordingly, the tranmissivity of the comparative example is lowered than the embodiment. Practically, it was confirmed that the transmissivity of the embodiment becomes 1.2 if the transmissivity of the comparative example is set to 1.

Figure 7:
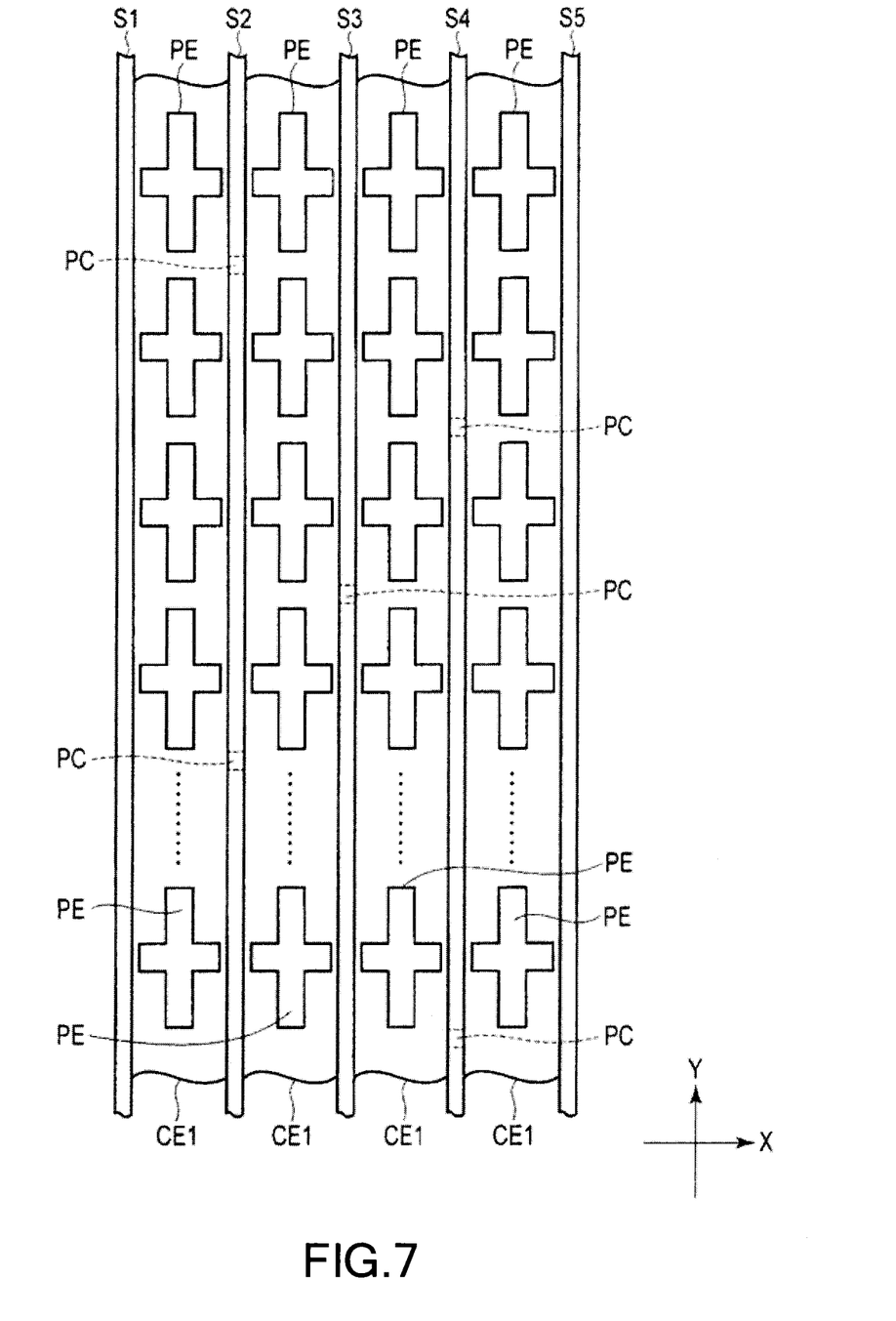
FIG. 7 is a plan view schematically showing a layout of the first common electrode CE1.

FIG. 7 is a plan view schematically showing a layout of the first common electrode CE1. In addition, only composition required for explanation is illustrated here.

Each of the first common electrodes CE1 is formed in a stripe shape extending in the second direction Y. One of the first common electrodes CE1 faces a plurality of pixel electrodes PE located in a line in the second direction Y. In order that each of the first common electrodes CE1 controls capacitive coupling with the source line S as above-mentioned, the adjoining first common electrodes CE1 are divided in an overlapping region with the source line S. However, it is preferable to electrically connect between the adjoining first common electrodes CE1 by connection electrodes PC arranged in dispersion. Adjacent connection electrodes PC are arranged having a plurality of pixels therebetween. Thereby it becomes possible to form the first common electrodes CE1 with low resistance mutually. In addition, although the connection electrodes PC intersect the source line S, since the area in which the connection electrodes PC intersect the source line S is small, the influence by the capacitive coupling resulted between the connection electrodes PC and the source line S is very small.

As explained above, according to the embodiment, the liquid crystal display device which improves display grace can be offered.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device, comprising:
   a first substrate including;
      a gate line extending in a first direction,
      a first interlayer insulating film covering the gate line,
      a first common electrode formed on the first interlayer insulating film and extending in a second direction crossing the first direction,
      a second interlayer insulating film covering the first common electrode,
      a source line extending in the second direction on the second interlayer insulating film,
      a third interlayer insulating film covering the source line,
      a pixel electrode including a main pixel electrode extending in the second direction on the third interlayer insulating film,
      a second common electrode including a second main common electrode extending in the second direction on the third interlayer insulating film and facing the source line, the second common electrode set to the same potential as the first common electrode, and
      a first alignment film covering the pixel electrode and the second common electrode,
   a second substrate including a second alignment film facing the first alignment film; and
   a liquid crystal layer held between the first substrate and the second substrate,
   the second substrate includes a third common electrode including a third main common electrode extending in the second direction and facing the second main common electrode, and the third common electrode is set to the same potential as the second common electrode, and
   the first common electrode faces the gate line.

2. The liquid crystal display device according to claim 1, wherein the first common electrode is arranged apart from a location facing the source line.

3. The liquid crystal display device according to claim 1, wherein
   the first substrate includes a seat electrode formed on the second interlayer insulating film and electrically coupled to the pixel electrode, and
   the seat electrode faces the first common electrode interposing the second interlayer insulating film therebetween.

4. A liquid crystal display device including a plurality of pixels arranged in a first direction and a second direction crossing the first direction in a matrix shape, each pixel comprising:
   a first substrate including;
      a gate line extending in the first direction,
      a first interlayer insulating film covering the gate line,
      a first common electrode formed on the first interlayer insulating film and extending in the second direction,
      a second interlayer insulating film covering the first common electrode,
      a pair of source lines extending in the second direction on the second interlayer insulating film,
      a third interlayer insulating film covering the pair of source lines,
      a pixel electrode including a main pixel electrode extending in the second direction on the third interlayer insulating film,
      a second common electrode including a second main common electrode extending in the second direction on the third interlayer insulating film and facing the pair of source lines, the second common electrode set to the same potential as the first common electrode, and
      a first alignment film covering the pixel electrode and the second common electrode,
   a second substrate including a second alignment film facing the first alignment film; and
   a liquid crystal layer held between the first substrate and the second substrate, wherein
   the pair of source lines of the plurality of pixels extend in the second direction sandwiching the first common electrode,
   a connection electrode connects between the adjacent first common electrodes crossing the source line,
   the connection electrodes are arranged in dispersion,
   the second substrate includes a third common electrode including a third main common electrode extending in the second direction and facing the second main common electrode, and the third common electrode is set to the same potential as the second common electrode, and
   the first common electrode faces the gate line.

5. The liquid crystal display device according to claim 4, wherein the first common electrode is arranged in a position apart from a location facing the source line.

6. The liquid crystal display device according to claim 4, wherein
   the first substrate includes a seat electrode formed on the second interlayer insulating film and electrically coupled to the pixel electrode, and
   the seat electrode faces the first common electrode interposing the second interlayer insulating film therebetween.

7. The liquid crystal display device according to claim 4, wherein
   adjacent connection electrodes are arranged having a plurality of pixels therebetween on the source line.

8. A liquid crystal display device including a plurality of pixels arranged in a first direction and a second direction crossing the first direction in a matrix shape, each pixel comprising:
   a first substrate including;

a gate line arranged substantially in the center of the pixel extending in a first direction, a first interlayer insulating film covering the gate line, a first common electrode formed on the first interlayer insulating film and extending in the second direction, a second interlayer insulating film covering the first common electrode, a pair of source lines arranged on the second interlayer insulating film extending in the second direction, the first common electrode arranged between the pair of source lines, a third interlayer insulating film covering the pair of source lines, a pixel electrode including a main pixel electrode arranged substantially in the center of the pixel and extending in the second direction, and a sub-pixel electrode arranged substantially in the center of the pixel and extending in the first direction, wherein the main pixel electrode and the sub-pixel electrode form a cross shape, and the gate line faces the sub-pixel electrode, a second common electrode including a pair of second main common electrodes extending in the second direction on the third interlayer insulating film and facing the pair of source lines, and a pair of sub-common electrodes arranged in an upper end portion and a lower end portion of the pixel extending in the first direction, wherein the second main common electrodes and the sub-common electrodes form a frame shape defining one pixel, and the second common electrode is set to the same potential as the first common electrode, and a first alignment film covering the pixel electrode and the second common electrode, a second substrate including a second alignment film facing the first alignment film; and a liquid crystal layer held between the first substrate and the second substrate, the second substrate includes a third common electrode including a third main common electrode extending in the second direction and facing the second main common electrode, and the third common electrode is set to the same potential as the second common electrode, and the first common electrode faces the gate line.

9. The liquid crystal display device according to claim 8, wherein the first substrate includes a seat electrode formed on the second interlayer insulating film and electrically coupled to the pixel electrode, and the seat electrode faces the first common electrode interposing the second interlayer insulating film therebetween.

* * * * *